(12) United States Patent
Parrella

(10) Patent No.: US 9,404,480 B2
(45) Date of Patent: Aug. 2, 2016

(54) SYSTEM AND METHOD OF CAPTURING GEOTHERMAL HEAT FROM WITHIN A DRILLED WELL TO GENERATE ELECTRICITY

(71) Applicant: PARDEV, LLC, Weston, CT (US)

(72) Inventor: Michael J. Parrella, Weston, CT (US)

(73) Assignee: Pardev, LLC, Weston, CT (US)

( * ) Notice: Subject to any disclaimer, the term of this patent is extended or adjusted under 35 U.S.C. 154(b) by 632 days.

(21) Appl. No.: 13/911,635

(22) Filed: Jun. 6, 2013

(65) Prior Publication Data

US 2014/0047836 A1 Feb. 20, 2014

Related U.S. Application Data

(62) Division of application No. 12/456,434, filed on Jun. 15, 2009, now Pat. No. 8,616,000.

(60) Provisional application No. 61/131,967, filed on Jun. 13, 2008.

(51) Int. Cl.
*F03G 7/04* (2006.01)
*F24J 3/08* (2006.01)
*F28F 13/00* (2006.01)

(52) U.S. Cl.
CPC . *F03G 7/04* (2013.01); *F24J 3/082* (2013.01); *F24J 3/086* (2013.01); *F28F 2013/006* (2013.01); *Y02E 10/125* (2013.01); *Y02E 10/16* (2013.01)

(58) Field of Classification Search
CPC ................. F03G 7/00; F03G 4/06; F24J 3/08
USPC .................... 60/341.2, 641.4, 641.5
See application file for complete search history.

(56) References Cited

U.S. PATENT DOCUMENTS 3,220,470 A 11/1965 Batch
3,274,769 A 9/1966 Reynolds
(Continued)

FOREIGN PATENT DOCUMENTS

CN 1206097 1/1999
DE 102005036472 9/2006
(Continued)

OTHER PUBLICATIONS 2 pages PCT International Search Report PCT/US2009/004517 date of mailing Apr. 6, 2010.
(Continued)

*Primary Examiner* — Thomas Denion
*Assistant Examiner* — Shafiq Mian
(74) *Attorney, Agent, or Firm* — Ware, Fressola, Maguire & Barber LLP

(57) ABSTRACT

A closed-loop, solid-state system generates electricity from geothermal heat from a well by flow of heat, without needing large quantities of water to conduct heat from the ground. The present invention contemplates uses for depleted oil or gas wells and newly drilled wells to generate electricity in an environmentally-friendly method. Geothermal heat is conducted from the Earth to a heat exchanging element to heat the contents of pipes. The pipes are insulated between the bottom of the well and the surface to minimize heat dissipation as the heated contents of the pipes travel to the surface.

36 Claims, 6 Drawing Sheets

(56) References Cited

U.S. PATENT DOCUMENTS

| | | | |
|---|---|---|---|
| 3,628,923 | A | 12/1971 | White |
| 3,658,123 | A | 4/1972 | Root |
| 3,786,858 | A | 1/1974 | Potter et al. |
| 3,911,683 | A | 10/1975 | Wolf |
| 3,936,652 | A | 2/1976 | Levine |
| 3,954,140 | A | 5/1976 | Hendrick |
| 3,957,108 | A * | 5/1976 | Van Huisen .............. F03G 7/04 165/45 |
| 3,988,896 | A | 11/1976 | Matthews |
| 4,030,549 | A | 6/1977 | Bouck |
| 4,051,677 | A | 10/1977 | Van Huisen |
| 4,060,988 | A | 12/1977 | Arnold |
| 4,094,356 | A | 6/1978 | Ash et al. |
| 4,117,344 | A | 9/1978 | Boerstler et al. |
| 4,151,260 | A * | 4/1979 | Woertz ............... B01D 53/1468 175/66 |
| 4,255,936 | A | 3/1981 | Cochran |
| 4,277,946 | A | 7/1981 | Bottum |
| 4,286,651 | A | 9/1981 | Steiger et al. |
| 4,314,853 | A | 2/1982 | Moens |
| 4,339,289 | A | 7/1982 | Lankard |
| 4,366,255 | A | 12/1982 | Lankard |
| 4,392,335 | A | 7/1983 | Heiman |
| 4,392,531 | A | 7/1983 | Ippolito |
| 4,398,842 | A | 8/1983 | Hodson |
| 4,400,259 | A | 8/1983 | Schutt |
| 4,448,043 | A | 5/1984 | Aragou |
| 4,513,040 | A | 4/1985 | Lankard |
| 4,538,673 | A | 9/1985 | Partin et al. |
| 4,588,443 | A | 5/1986 | Bache |
| 4,642,987 | A | 2/1987 | Csorba et al. |
| 4,668,548 | A | 5/1987 | Lankard |
| 4,714,108 | A | 12/1987 | Barry |
| 4,741,388 | A | 5/1988 | Kuroiwa |
| 4,780,141 | A | 10/1988 | Double et al. |
| 4,806,168 | A | 2/1989 | Ivarsson et al. |
| 4,854,372 | A | 8/1989 | Sakaya et al. |
| 4,912,941 | A | 4/1990 | Buchi |
| 4,979,992 | A | 12/1990 | Bache |
| 5,081,848 | A | 1/1992 | Rawlings et al. |
| 5,114,487 | A | 5/1992 | Gartshore et al. |
| 5,272,879 | A | 12/1993 | Wiggs |
| 5,296,187 | A | 3/1994 | Hackman |
| 5,308,572 | A | 5/1994 | Hackman |
| 5,442,906 | A | 8/1995 | Broadus |
| 5,447,564 | A | 9/1995 | Xie et al. |
| 5,497,624 | A | 3/1996 | Amir et al. |
| 5,536,310 | A | 7/1996 | Brook et al. |
| 5,564,282 | A | 10/1996 | Kaye |
| 5,613,452 | A | 3/1997 | Marchesi et al. |
| 5,623,986 | A | 4/1997 | Wiggs |
| 5,626,647 | A | 5/1997 | Kohr |
| 5,816,314 | A * | 10/1998 | Wiggs ..................... F24J 3/083 165/134.1 |
| 5,911,897 | A | 6/1999 | Hamilton |
| 6,080,234 | A | 6/2000 | Clavaud et al. |
| 6,251,179 | B1 | 6/2001 | Allan |
| 6,280,521 | B1 | 8/2001 | Carter, Jr. |
| 6,379,031 | B1 | 4/2002 | Weingart et al. |
| 6,502,636 | B2 | 1/2003 | Chatterji et al. |
| 6,503,318 | B2 | 1/2003 | Pye et al. |
| 6,569,235 | B2 | 5/2003 | Carter, Jr. |
| 6,668,573 | B1 | 12/2003 | Gilsdorf |
| 6,694,757 | B1 | 2/2004 | Backman |
| 6,789,608 | B1 | 9/2004 | Wiggs |
| 6,860,936 | B2 | 3/2005 | Carter, Jr. |
| 7,067,004 | B2 | 6/2006 | Matula et al. |
| 7,361,977 | B2 * | 4/2008 | Lange ............... H01L 23/49541 257/666 |
| 7,452,417 | B2 | 11/2008 | Matula et al. |
| 7,578,910 | B2 | 8/2009 | Sirola et al. |
| 7,753,122 | B2 | 7/2010 | Curlett |
| 7,856,839 | B2 * | 12/2010 | Wiggs ..................... F24J 3/081 165/45 |
| 7,938,904 | B1 | 5/2011 | Wiggs |
| 7,939,154 | B2 | 5/2011 | Fosnacht et al. |
| 8,003,844 | B2 | 8/2011 | Dana et al. |
| 8,246,269 | B2 | 8/2012 | Shaw et al. |
| 8,616,000 | B2 * | 12/2013 | Parrella ................... F03G 7/04 165/45 |
| 2003/0051639 | A1 | 3/2003 | Dams et al. |
| 2003/0056936 | A1 | 3/2003 | Lindemuth et al. |
| 2003/0071373 | A1 | 4/2003 | Hubbard et al. |
| 2004/0031585 | A1 | 2/2004 | Johnson, Jr. et al. |
| 2004/0211184 | A1 | 10/2004 | Bharathan et al. |
| 2005/0061472 | A1 | 3/2005 | Guynn et al. |
| 2005/0150225 | A1 | 7/2005 | Gwiazda et al. |
| 2005/0194576 | A1 | 9/2005 | Sirola et al. |
| 2006/0037267 | A1 | 2/2006 | Taylor, Jr. et al. |
| 2006/0249276 | A1 | 11/2006 | Spadafora et al. |
| 2007/0187078 | A1 | 8/2007 | Greaney et al. |
| 2007/0223999 | A1 | 9/2007 | Curlett |
| 2007/0284107 | A1 * | 12/2007 | Crichlow .............. E21B 43/166 166/302 |
| 2008/0073248 | A1 | 3/2008 | Shah et al. |
| 2008/0245068 | A1 | 10/2008 | Bastawros et al. |
| 2008/0289334 | A1 | 11/2008 | Orosz et al. |
| 2009/0120090 | A1 | 5/2009 | DuBois |
| 2010/0209666 | A1 | 8/2010 | Rivard et al. |
| 2010/0300092 | A1 | 12/2010 | Eli et al. |
| 2011/0011558 | A1 | 1/2011 | Dorrian et al. |
| 2012/0144829 | A1 * | 6/2012 | Wiggs ..................... F03G 7/04 60/641.2 |
| 2012/0292816 | A1 | 11/2012 | Muratoglu et al. |
| 2015/0159918 | A1 * | 6/2015 | Parrella ..................... F24J 3/08 165/45 |

FOREIGN PATENT DOCUMENTS

| | | |
|---|---|---|
| DE | 102005060970 | 6/2007 |
| GE | 1800 | 7/1999 |
| JP | S49-124646 | 11/1974 |
| JP | S57-12571 | 1/1982 |
| JP | 59003178 | 1/1984 |
| JP | S61-79942 | 4/1986 |
| JP | 8284106 | 10/1996 |
| JP | 2001081712 | 3/2001 |
| JP | 2003-148079 | 5/2003 |
| JP | 2004052385 | 2/2004 |
| JP | 2004169985 | 6/2004 |
| JP | 2007177490 | 7/2007 |
| JP | 2008088652 | 4/2008 |
| KR | 1020050034535 | 4/2005 |
| KR | 1020060021023 | 3/2006 |
| RU | 2004889 | 12/1993 |
| RU | 2096696 | 11/1997 |
| RU | 2115868 | 7/1998 |
| RU | 2206751 | 9/2005 |
| SU | 1730439 | 4/1992 |
| SU | 1749497 | 7/1992 |

OTHER PUBLICATIONS 3 pages PCT International Search Report PCT/US2009/004515 date of mailing Feb. 3, 2010.

4 pages PCT International Search Report PCT/US2009/004518 date of mailing Apr. 6, 2010; including 1st page of Publication WO 2010/016921 A3.

3 pages PCT International Search Report PCT/US2009/004516 date of mailing Apr. 2, 2010; including 1st page of Publication WO 2010/016920 A3.

International Search Report dated Sep. 7, 2012, 1 page.

Sanyal, Subir K. and Butler, Steven J., "An Analysis of Power Generation Prospects from Enhanced Geothermal Systems," Proceedings World Geothermal Congress 2005, Antalya, Turkey, Apr. 24-29, 2005 (6 pages).

Rybach, Ladislaus, "Geothermal Sustainability," GHC Bulletin, Sep. 2007 (6 pages).

"Large Titanium Heat Exchangers Design, Manufacture, and Fabrication Issues", L. Bower, Joseph Oat Corporation, J. Banker, DMC Clad Metal, Corrosion Solutions Conference 2003, Wah Chang, Sep. 2003. (13 pages).

(56) References Cited

OTHER PUBLICATIONS

ThermoPEX, Central Boiler, Inc., 2052 150th Street, Greenbush, MN 56726, Dec. 2005.

"High-Pressure Flexible Pipe, the next frontier", J. Remery, S. Groves, H. Morand, A. Felix-Henry, D. Percy, J. Day, www.offshore-mag.com, vol. 67, Issue 5, May 2007. (5 pages).

Technip Flexible Pipe, Technologies and products. (12 pages).

"Development of Flexible Pipe for Pipe-in-Pipe Technology", T. Kagoura, K. Ishii, S. Abe, T. Inoue, T. Hayashi, T. Sakamoto, T. Mochizuki and T. Yamada, Furukawa Review No. 24, 2003, pp. 69-74.

International Search Report for PCT/US12/70104, Mar. 21, 2014 (8 pages).

Supplementary European Search Report for EP Application No. 09762945, Mar. 10, 2014 (8 pages).

\* cited by examiner

SYSTEM AND METHOD OF CAPTURING GEOTHERMAL HEAT FROM WITHIN A DRILLED WELL TO GENERATE ELECTRICITY

CROSS REFERENCE TO RELATED APPLICATIONS

This application is a divisional application of prior U.S. patent application Ser. No. 12/456,434 filed Jun. 15, 2009, which claims the benefit of U.S. Provisional Application No. 61/131,967, filed on Jun. 13, 2008, the contents of both of which are hereby incorporated by reference in their entirety.

STATEMENT REGARDING FEDERALLY-SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates generally to the field of converting geothermal energy into electricity. More specifically, the present invention relates to capturing geothermal heat from deep within a drilled well and bringing this geothermal heat to the Earth's surface to generate electricity in an environmentally friendly process.

Wells that have been drilled for oil and gas exploration that are either depleted, or have never produced oil or gas, usually remain abandoned and/or unused and may eventually be filled. Such wells were created at a large cost and create an environmental issue when no longer needed for their initial use.

Wells may also be drilled specifically to produce heat. While there are known geothermal heat/electrical methods and systems for using the geothermal heat/energy from deep within a well (in order to produce a heated fluid (liquid or gas) and generate electricity therefrom), these methods have significant environmental drawbacks and are usually inefficient in oil and gas wells due to the depth of such wells.

More specifically, geothermal heat pump (GHP) systems and enhanced geothermal systems (EGS) are well known systems in the prior art for recovering energy from the Earth. In GHP systems, geothermal heat from the Earth is used to heat a fluid, such as water, which is then used for heating and cooling. The fluid, usually water, is actually heated to a point where it is converted into steam in a process called flash steam conversion, which is then used to generate electricity. These systems use existing or man made water reservoirs to carry the heat from deep wells to the surface. The water used for these systems is extremely harmful to the environment, as it is full of minerals, is caustic and can pollute water aquifers. Such deep-well implementations require that a brine reservoir exists or that a reservoir is built by injecting huge quantities of water into an injection well, effectively requiring the use of at least two wells. Both methods require that polluted dirty water is brought to the surface. In the case of EGS systems, water injected into a well permeates the Earth as it travels over rock and other material under the Earth's surface, becoming polluted, caustic, and dangerous.

A water-based system for generating heat from a well presents significant and specific issues. For example, extremely large quantities of water are often injected into a well. This water is heated and flows around the inside of the well to become heated and is then extracted from the well to generate electricity. This water becomes polluted with minerals and other harmful substances, often is very caustic, and causes problems such as seismic instability and disturbance of natural hydrothermal manifestations. Additionally, there is a high potential for pollution of surrounding aquifers. This polluted water causes additional problems, such as depositing minerals and severely scaling pipes.

Geothermal energy is present everywhere beneath the Earth's surface. In general, the temperature of the Earth increases with increasing depth, from 400°-1800° F. at the base of the Earth's crust to an estimated temperature of 6300°-8100° F. at the center of the Earth. However, in order to be useful as a source of energy, it must be accessible to drilled wells. This increases the cost of drilling associated with geothermal systems, and the cost increases with increasing depth.

In a conventional geothermal system, such as for example and enhanced geothermal system (EGS), water or a fluid (a liquid or gas), is pumped into a well using a pump and piping system. The water then travels over hot rock to a production well and the hot, dirty water or fluid is transferred to the surface to generate electricity.

As mentioned earlier herein, the fluid (water) may actually be heated to the point where it is converted into gas/steam. The heated fluid or gas/steam then travels to the surface up and out of the well. When it reaches the surface, the heated water and/or the gas/steam is used to power a thermal engine (electric turbine and generator) which converts the thermal energy from the heated water or gas/steam into electricity.

This type of conventional geothermal system is highly inefficient in very deep wells for several reasons. First, in order to generate a heated fluid required to efficiently operate several thermal engines (electric turbines and generators), the fluid must be heated to degrees of anywhere between 190° F. and 1000° F. Therefore the fluid must obtain heat from the surrounding hot rock. As it picks up heat it also picks up minerals, salt, and acidity, causing it to very caustic. In order to reach such desired temperatures in areas that lack a shallow-depth geothermal heat source (i.e. in order to heat the fluid to this desired temperature), the well used must be very deep. In this type of prior art system, the geologies that can be used because of the need for large quantities of water are very limited.

The deeper the well, the more challenging it is to implement a water-based system. Moreover, as the well becomes deeper the gas or fluid must travel further to reach the surface, allowing more heat to dissipate. Therefore, using conventional geothermal electricity-generating systems can be highly inefficient because long lengths between the bottom of a well and the surface results in the loss of heat more quickly. This heat loss impacts the efficacy and economics of generating electricity from these types of systems. Even more water is required in such deep wells, making geothermal electricity-generating systems challenging in deep wells.

Accordingly, prior art geothermal systems include a pump, a piping system buried in the ground, an above ground heat transfer device and tremendous quantities of water that circulate through the Earth to pick up heat from the Earth's hot rock. The ground is used as a heat source to heat the circulating water. An important factor in determining the feasibility of such a prior art geothermal system is the depth of wellbore, which affects the drilling costs, the cost of the pipe and the size of the pump. If the wellbore has to be drilled to too great a depth, a water-based geothermal system may not be a practical alternative energy source. Furthermore, these water-based systems often fail due to a lack of permeability of hot rock within the Earth, as water injected into the well never reaches the production well that retrieves the water.

BRIEF SUMMARY OF THE INVENTION

The present invention discloses, generally, a system and method of economically conducting geothermal heat from a well to the Earth's surface and then using this heat to generate electricity in a closed-loop, solid state system. This system and method, known as GTherm, is environmentally responsible because there is no fluid flow from the Earth. It is entirely based on heat flow from rock deep within a well through solid materials to heat contents of pipes pumped in a closed loop from and to the Earth's surface.

The present invention discloses a system for generating electricity using geothermal heat from within a drilled well, comprising a heat harnessing component having a closed-loop solid state heat extraction system. The closed-loop solid state heat extraction system includes a heat exchanging element positioned within a heat nest in a well and a heat conductive material inserted into the well to conduct geothermal heat from the rock surrounding the heat nest to the heat exchanging element. The rock surrounding the heat nest heats the heat conductive material to an equilibrium temperature determined by a surface area of the rock surrounding the heat nest, the equilibrium temperature being a temperature at which the rock surrounding the heat nest and generating the geothermal heat continually recoups the geothermal heat it is conducting to the heat conductive material and above which the geothermal heat generated by the rock surrounding the heat nest dissipates as the heat conductive material conducts heat from the rock surrounding the heat nest to the heat exchanging element. The system also includes an electricity generating component that includes a thermal engine, the electricity generating component receiving geothermal heat from contents of a piping component coupling the heat harnessing component to the electricity generating component, the piping component including a set of downward-flowing pipes and a set of upward-flowing pipes, the upward-flowing pipes conveying contents of the piping component heated by the heat exchanging element to a surface of the well and into the electricity generating component. The system further includes insulation inserted into the well and substantially surrounding at least the upward-flowing pipes at at least one position between the heat nest and the surface of the well to maintain a temperature of the contents of the piping system substantially constant as the contents of the piping system are pumped to the surface of the well. The closed-loop, solid state heat extraction system extracts geothermal heat from the well without exposing the rock surrounding the heat nest to a liquid flow.

In another embodiment, the present invention discloses a heat extraction system for generating geothermal heat from within a drilled well. The heat extraction system comprises a heat conductive material injected into an area within a heat nest near a bottom of a drilled well between a heat exchanging element and rock surrounding the heat nest to form a closed-loop, solid state heat exchange to heat contents of a piping system flowing into and out of the heat exchanging element at an equilibrium temperature at which the rock surrounding the heat nest and generating the geothermal heat continually recoups the geothermal heat it is conducting to the heat conductive material and above which the geothermal heat generated by the rock surrounding the heat nest dissipates as the heat conductive material conducts heat from the rock surrounding the heat nest to the heat exchanging element. The heat conductive material solidifies to substantially fill the area within the heat nest to transfer heat from the rock surrounding the heat nest and the heat exchanging element, the piping system bringing the contents of the piping system from a surface of the well into the heat nest and carrying heated contents to the surface of the well from the heat nest. The closed-loop solid state heat extraction system extracts geothermal heat from the well without exposing the rock surrounding the heat nest to a liquid flow.

In another embodiment, the present invention discloses a method of generating electricity using geothermal heat from within a drilled well. The method comprises extracting geothermal heat from rock surrounding a heat nest positioned at a location within a well by injecting a heat conductive material into the heat nest to surround a heat exchanging element to form a closed-loop, solid-state heat extraction system, the heat conductive material exchanging geothermal heat from the rock surrounding the heat nest to the heat exchanging element to heat contents of a piping system, the contents heated within the heat nest at an equilibrium temperature at which the rock surrounding the heat nest and generating the geothermal heat continually recoups the geothermal heat it is exchanging with the heat conductive material and above which the geothermal heat generated by the rock surrounding the heat nest dissipates as the heat conductive material exchanges heat from the rock surrounding the heat nest to the heat exchanging element. The method also comprises insulating the piping system at at least one point between the heat nest and the surface of the well to maintain a temperature of the contents of the piping system substantially constant as the contents of the piping system are pumped to the surface of the well. The method further comprises pumping the heated contents of the piping system into an electricity generating component after the heated contents of the piping system reach the surface of the well. The closed-loop solid state heat extraction system extracts geothermal heat from the well without exposing the rock surrounding the heat nest to a liquid flow.

In still another embodiment, the present invention discloses a method of extracting geothermal heat from within a drilled well. The method comprises determining a type of rock at a depth of a well, a surface area of the rock at the depth of the well, and a heat conductivity factor of the rock at the depth of the well, increasing the surface area of the rock at a desired point in the well between a heat point of the well and a bottom of the well, and forming a heat nest within the well beginning at the bottom of the well and ending at the heat point of the well. The method also includes injecting a heat conductive material between rock surrounding the heat nest and a heat exchanging element within the heat nest to form a closed-loop, solid-state heat extraction system to exchange heat from the rock surrounding the heat nest to the heat exchanging element to heat contents of a piping system flowing into and out of the heat exchanging element at an equilibrium temperature at which the rock surrounding the heat nest and generating the geothermal heat continually recoups the geothermal heat it is exchanging with the heat conductive material and above which the geothermal heat generated by the rock surrounding the heat nest dissipates as the heat conductive material exchanges heat from the rock surrounding the heat nest to the heat exchanging element. The method further comprises insulating the piping system between the heat nest and a surface of the well. The closed-loop solid state heat extraction system extracts geothermal heat from the well without exposing the rock surrounding the heat nest to a liquid flow.

Other embodiments, features and advantages of the present invention will become more apparent from the following description of the embodiments, taken together with the accompanying several views of the drawings, which illustrate, by way of example, the principles of the invention.

DETAILED DESCRIPTION OF THE INVENTION

In the following description of the present invention reference is made to the accompanying drawings which form a part thereof, and in which is shown, by way of illustration, exemplary embodiments illustrating the principles of the present invention and how it may be practiced. It is to be understood that other embodiments may be utilized to practice the present invention and structural and functional changes may be made thereto without departing from the scope of the present invention.

The present invention economically and efficiently conducts geothermal heat from deep within a well to the surface of the Earth, and then uses this geothermal heat to generate electricity in a closed-loop, solid-state system. This closed-loop, solid-state system generates electricity by heat flow rather than by water flow, so that it does not require large quantities of water separately injected into the well.

Figure 1:
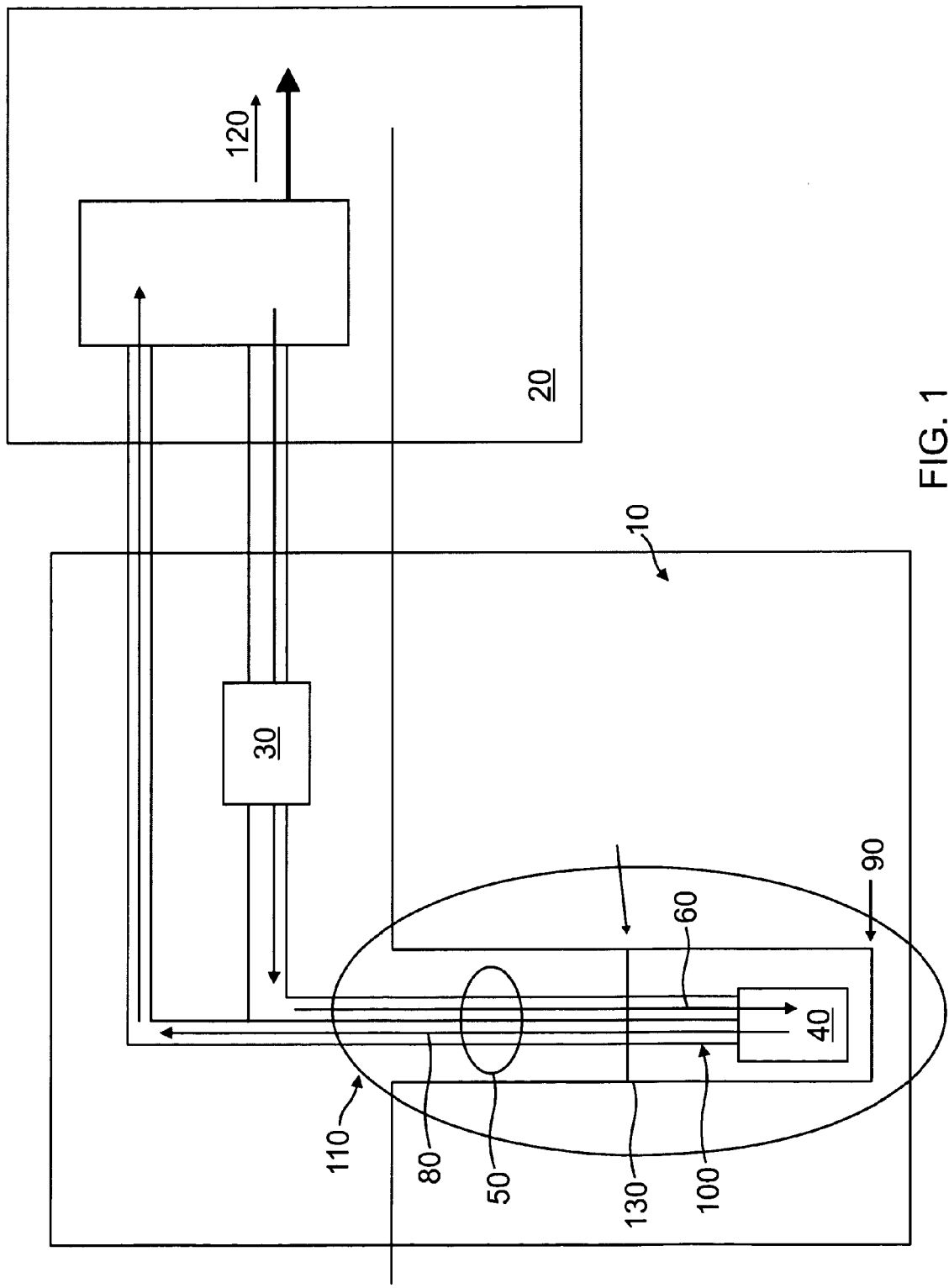
FIG. 1 is a block view of a system according to one embodiment of the present invention showing a closed loop system having pipes, a heat harnessing component, and an electricity generating component.

Referring to FIG. 1, the present invention includes a heat harnessing component 10 and an electricity generating component 20. As shown in FIG. 1, the heat harnessing component 10 includes a heat exchanging element 40, and a heat conductive material 100 that transfers geothermal heat from hot rock near a bottom 90 of the well 110 to the heat exchanging element 40. The present invention also includes a piping system 50, comprised of one or more downward-flowing pipes 60 and one or more upward-flowing pipes 80. The piping system's 50 contents, pumped from and to the surface by a pumping mechanism 30, include a heat conductive fluid or gas that flows through the closed-loop system and carries heat to the surface of the well 110. The electricity generating component 20 includes a thermal engine 120 which converts heat into electrical energy. The thermal engine 120 may include an electric turbine and a generator. The piping system 50 couples the heat harnessing component 10 and the electricity generating component 20 together.

The downward-flowing pipes 60 and the upward-flowing insulated pipes 80 of the piping system 50 may be insulated with insulation 70. The diameter of the downward-flowing pipes 60 and the upward-flowing insulated pipes 80 used in the piping system 50 may vary, and should be determined in accordance with the specific flow requirements desired. In another embodiment, the downward flowing insulated pipes 60 and the upward flowing insulated pipes 80 are integrated into a single element, to the fullest extent possible, in order to simplify installation.

In another embodiment, the one or more downward-flowing pipes 60 and the one or more upward-flowing insulated pipes 80 are made of a flexible material and can be spooled into the well. The piping system 50 is therefore flexible and comprised of several different layers of wound corrosion resistant steel wiring and leak-proof thermoplastic polymers such as polyethylene, polyamide 11, and/or PVD. The number of layers used in any one particular pipe in the piping system 50 will be determined as a function of the depth of the well and pressure/temperature requirements.

Utilizing the pumping mechanism 30 and the piping system 50, contents of the piping system 50, which may be a heat conductive fluid comprised of liquid or gas, are piped downward through the one or more downward flowing pipes 60 and into the well 110. The contents are pumped downward through the one or more downward pipes 60 to a level of the well 110 where there is significant geothermal heat that is sufficient to heat the contents. This lowest depth where the first appropriate heat is encountered will be referred to hereinafter as the heat point 130, although it is understood that there is geothermal heat at many levels and this geothermal heat becomes greater as the depth of the well 110 increases. The area between the heat point 130 and the bottom 90 of the well 110 is called the heat nest 140.

The heat exchanging element 40 is positioned in the heat nest 140 at a point between the heat point 130 of the well 110 and the bottom 90 of the well 110. The downward-flowing pipes 60 are coupled to this heat exchanging element 40 on a first side 150, allowing the contents to pass through the heat exchanging element 40 on the first side 150 of the heat exchanging element 40. The heat exchanging element 40 draws geothermal heat from the Earth using the heat conducting material 100 which interfaces with the hot rock surrounding the heat nest 140 and uses this geothermal heat to heat the contents as they pass through the heat exchanging element 40. Unlike conventional systems which will simply draw a heated fluid from a well to the top surface, and then utilize a heating element in order to further heat the fluid at the surface level, the present invention has its heat exchanging element 40 actually contained deep within the well 110 itself. The heat exchanging element 40 and the heat conductive material 100 form a closed-loop, solid state extraction system in which heat flows rather than water. This closed-loop, solid state extraction system has no negative environmental impacts and only requires the presence of hot rock.

The heat nest 140 is constructed at a desired depth after a surface area of the surrounding rock has been increased to ensure maximum temperature and flow of geothermal heat generated by the rock. A variety of techniques, discussed herein, may be employed to increase surface area of the rock. Increasing the surface area of the rock ensures a steady, continual equilibrium temperature and maximum flow of geothermal heat from the surrounding rock and into the heat conductive material 100, which is injected after the heat nest 140 is constructed. Therefore, it is an objective of the present invention to increase the surface area of the rock surrounding the to-be-built heat nest 140 as much as possible, as doing so improves heat flow from the rock to the heat conductive material 100 to the heat exchanging element 40 to the contents of the piping system 50.

One method of increasing the surface area of the rock is by fracturing the rock surrounding the heat nest 140 to create cracks and crevices that expand the surface area. The present invention contemplates that many ways of fracturing the rock may be used, including through hydro-fracting, through drilling bore holes in multiple directions as described herein, and generally any current or future method of breaking or fracturing rock deep under the Earth's surface.

Accordingly, the equilibrium temperature is the temperature, or range of temperatures in one embodiment, in the system and method of the present invention at which geothermal heat heating the contents of the piping system 50 equals the rate at which the hot rock supplying the geothermal heat recoups, or re-generates, the heat it is transferring out. If geothermal heat is transferred out above the equilibrium temperature, geothermal heat in the hot rock will be depleted or dissipated, and rate and temperature of the heat extraction deteriorates. If geothermal heat is transferred out at or below the equilibrium temperature, the rate of heat extraction will be continual and steady, therefore a steady state heat extraction system is achieved.

Heat exchanging elements generally are devices built for efficient heat transfer which typically transfer heat from one fluid to another. Such heat exchanging elements therefore feature a fluid flow in which fluid flows through two sides of the heat exchanging element, with one fluid heating the other. They are widely used in many engineering processes. Some examples include intercoolers, pre-heaters, boilers and condensers in power plants.

Figure 2:
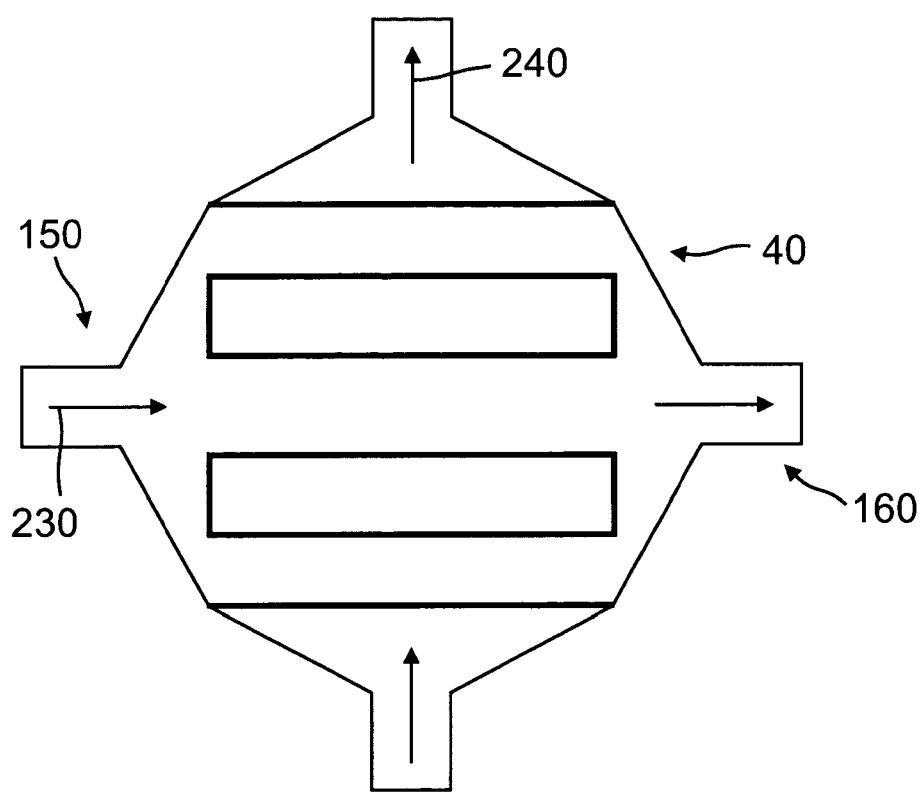
FIG. 2 is a close-up view of a heat exchanging element according to embodiment of the present invention.

FIG. 2 is a diagram showing the heat exchanging element 40 utilized in the present invention. A heat exchanging element 40 heats fluid within the closed-loop, steady state heat extraction system according to the present invention by a heat flow, rather than a fluid flow. By applying the first law of thermodynamics to a heat exchanging element working at steady-state condition, we obtain:

$$\mu \chi = o$$

where, $\mu$=mass flow of the i-th fluid $\chi$=change of specific enthalpy of the i-th fluid Referring to FIG. 2, the heat exchanging element 40 is shown as a cross-flow heat exchanger in which heat flows perpendicular to the fluid which needs to be heated, such that the heat flow 240 passes over/around the exchanger in a perpendicular direction, thereby heating the fluid 230 which flows through from a direction perpendicular to the heat flow 240.

In one embodiment, the heat exchanging element 40 of the present invention is a high-temperature heat exchanger ("HTHE") comprised of a recuperative type "cross flow" heat exchanger, in which fluids exchange heat on either side of a dividing wall. Alternatively, the heat exchanging element 40 may be comprised of an HTHE which utilizes a regenerative and/or evaporative design. Regardless of the configuration of heat exchanging element used, the present invention contemplates that fluid passing through the heat exchanging element 40 is heated by a heat flow generated by extracting geothermal heat from rock surrounding the heat nest 140, rather than a flow of more than one fluid.

In another embodiment, the heat exchanging element 40 includes a plurality of smaller capillaries 170. The contents enter the heat exchanging element 40 from the one or more downward-flowing pipes 60, where the contents are then dispersed, flowing through each of the plurality of smaller capillaries 170. The capillaries 170 may be thinner than the one or more downward-flowing pipes 60. For example, the plurality of capillaries 170 may have a smaller diameter than the one or more downward-flowing pipes 60, thereby allowing the contents to heat more quickly as it passes through the capillaries 170—and thereby increasing the overall efficacy of the heat exchanging element 40. In another embodiment, the combined flow of the capillaries 170 of the heat exchanging element 40 must be able to accommodate an equal or greater flow than the one or more downward-flowing pipes 60 and the one or more upward-flowing pipes 80.

In yet another embodiment, the heat exchanging element 40 may be comprised of a titanium clad tubesheet, wherein the tubesheet may be formed from a high temperature nickel based alloy or ferritic steel. In this way, the heat exchanging element 40 is able to operate efficiently under high temperature/pressure conditions. Moreover, the thickness of the titanium may vary in accordance with specific temperature and/or pressure conditions under which the heat exchanging element 40 operates.

It is understood that there are other types of heat exchanging elements 40 known in the art which may also be used in the present invention. Examples include but are not limited to parallel heat exchangers and/or reverse flow heat exchangers. In alternative embodiments, any of these types of exchangers may be utilized. A primary consideration in designing the heat exchanging element 40 will be to ensure its efficient operation under high temperature/pressure conditions. Further, any such heat exchanging element 40 utilized in the present invention must be sized to fit within the bore hole 190 of the well 110.

Additionally, the internal components of the heat exchanging element 40 may include different forms designed to maximize the amount of heat transferred into the piping system 50 within the heat exchanging element 40 to heat the contents as much as possible.

Still referring to FIG. 1, the one or more upward-flowing pipes 80 of the piping system 50 are coupled to the heat exchanging element 40 on a second, opposing side 160 of the heat exchanging element 40. The one or more upward-flowing pipes 80 draw the heated contents from the heat exchanging element 40 and bring the heated contents upward from the heat point 130 in the well 110 to the top 180, or surface. The bore hole 190 from the heat point 130 to the top 180 of the well 110 is completely insulated to prevent heat loss. The heat exchanging element 40 and the piping system 50 form a closed loop that separates the contents from the environment creating a completely environmentally-friendly system.

In one embodiment, the fluid that needs to be heated (or, also used herein, the contents of the piping system 50) should be optimized to carry heat. An example of such a fluid is antifreeze used in automobiles. Gas or water can also be used as a fluid. Further, the fluid should not have any corrosive properties, and the material used to construct the piping system 50 needs to be resistant to the fluid. Moreover, the fluid is pressurized within the piping system 50 so the system should be able to withstand pressure generated by the depth of the well 110 and the pumping mechanism 30, as the fluid is pumped through the system. The fluid used is environmentally inert and causes no environmental issues should the piping system 50 break.

Referring still to FIG. 1 and construction of a system according to the present invention, once the piping system 50 and heat exchanging element 40 are fully installed in the well 110, the heat nest 140 is completely filled with the heat conductive material 100. Once the heat conductive material 100 fills the heat nest 140, the rest of the bore hole of the well 110 is filled with insulation 70. The heat conductive material 100 must have heat conductive properties and allow it to bond and solidify within the heat nest 140. The heat conductive material 100 is designed to retain and conduct heat efficiently, maintaining a substantially constant temperature throughout the heat nest 140. The heat conductive material 100 connects the hot rock surrounding the heat nest 140 to the heat exchanging element 40, creating the heat harnessing component 10.

The heat conductive material 100 used in the present invention may take many forms. Generally, any substance or material that conducts heat at the temperatures required within a well 110 may be used. Examples of such substances or material include but are not limited to grout, enhanced grout, plastic, ceramics, enhanced ceramics, molten metal such as for example copper, or any combination of these.

Additionally, the present invention contemplates that one or more additional materials may also be injected into a well 110 (via a pipe such as large diameter pipe 210) and may be used to capture and conduct geothermal heat generated from surface area of the rock. Examples of such additional material include, but are not limited to, ball bearings, beads, wire or metallic mesh, and pipes. Such additional material increases the conduction of the geothermal heat by filling cracks and crevices in the rock surrounding the heat nest 140. By expanding the surface area of the rock surrounding heat nest 140 and using the additional material, the capacity of the heat conductive material 100 is expanded. The additional material itself increases the surface area of conduction, meaning that geothermal heat conducted from the rock surrounding the heat nest 140 is released over greater surface areas provide by the introduction of the additional materials into the heat nest 140. The heat conductive material 100, injected into the heat nest 140 via the large diameter pipe 210, also fills these cracks and crevices around the additional material and solidifies, adding to the conduction capabilities by way of increased surface area. Thus, the heat conductive material 100 may be used in conjunction with such additional material to take advantage of increases in the surface area of the rock surrounding the heat nest 140.

The present invention also contemplates, in another embodiment, that such additional materials could be used without heat conductive material 100. Additional materials as described herein also conduct geothermal heat from rock surrounding the heat nest to the heat exchanging element 40. In an embodiment where the heat conductive material 100 is used together with the additional materials as described here, the heat conductive material 100 bonds with the additional materials and solidifies around them.

The present invention also contemplates that the system may further include the equilibrium temperature being increased by increasing the surface are of the rock surrounding the heat nest; at least one additional bore hole being drilled into the rock to increase the surface area of the rock; and at least one additional material being injected into the heat nest, wherein the at least one additional material is a heat rod.

Figure 3:
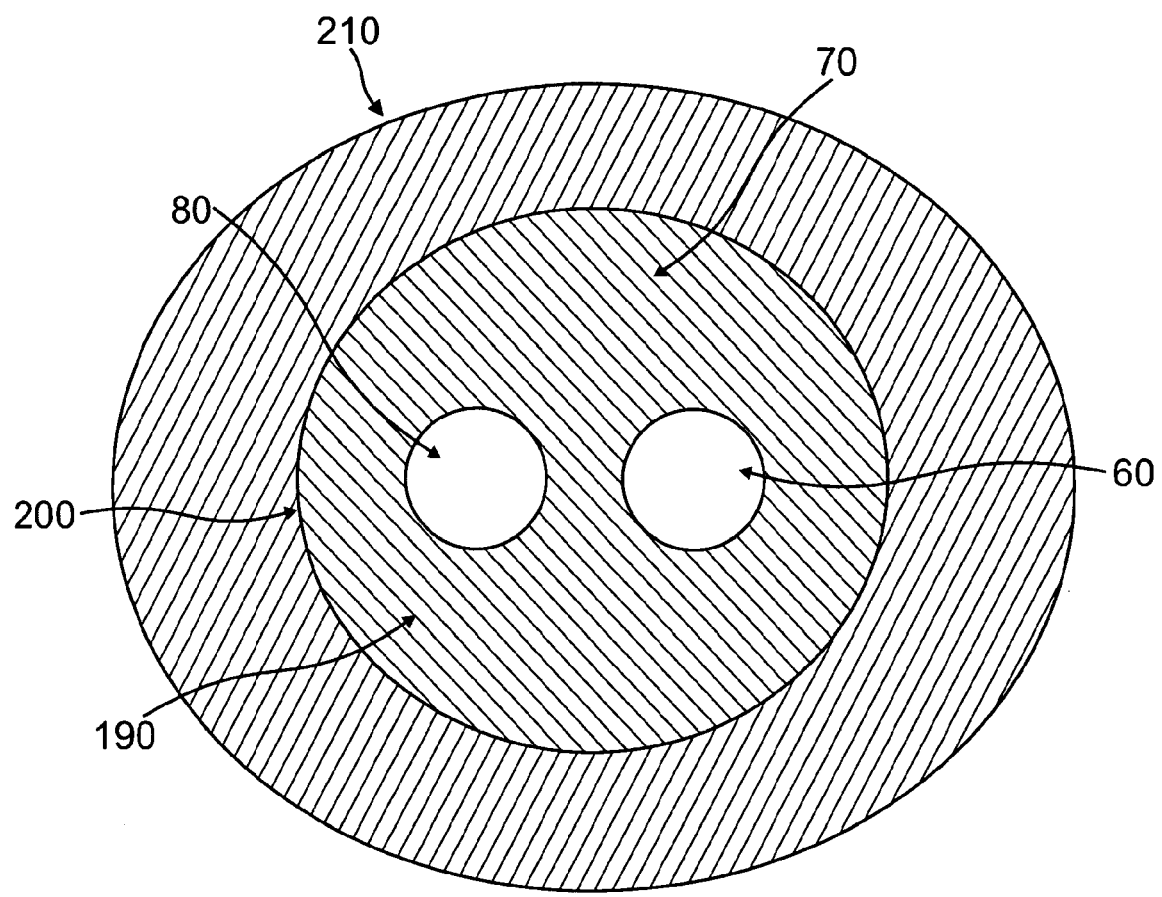
FIG. 3 is a cross-sectional view pipes in a bore hole of a well according to one embodiment of the present invention.

FIG. 3 illustrates a cross-sectional diagram for a well 110 in which the system of the present invention is utilized. The bore hole 190 of the well 110 has positioned therein the one or more upward-flowing pipes 60 and the one or more downward-flowing pipes 80. A space between the wall 200 of the bore hole 190 and the one or more downward-flowing pipes 60 and the one or more upward-flowing pipes 80 is filled with insulation 70. A large diameter pipe 210 is filled with the heat conductive material 100, such that the heat conductive material 100 surrounds the one or more upward-flowing pipes 60 and the one or more downward-flowing pipes 80.

As explained earlier herein, this heat conductive material 100 may harden but does not expand, causing no pressure on the piping system 50 or heat exchanging element 40. Once the heat conductive material 100 has been inserted into the well 110 and has hardened around the heat exchanging element 40 and piping system 50 in the heat nest 140, it will begin to heat up until it becomes fully heated and reaches a temperature of the rock surrounding the heat nest 140 at the bottom 90 of the well 110. As the heat conductive material 100 reaches this heat equilibrium temperature, it exchanges the geothermal heat from the hot rock surrounding the heat nest 140 to the heat exchanging element 40. The remaining portion of the well 110 is filled with insulation 70 that keeps the heated contents hot as the heated contents travel up the well 110 through the one or more upward-flowing pipes 80. This minimizes energy loss so the contents can be used more efficiently for the generation of power at the top 180 of the well 110. Accordingly, the heat conductive material 100 operates as a type of "heating track" which surrounds the heat exchanging element 40 in the well 110. This heating track maximizes the heat of the contents and extends the heat exchanging element 40 into the hot rock creating the heat harnessing component 10.

More specifically, the geothermal heat from the hot rock in the well 110 heats the heat conductive material 100 until the system achieves an equilibrium temperature. When the system reaches the equilibrium temperature, the heat conductive material 100 should be as hot as the hot rock surrounding the heat nest 140. Therefore, as the contents of the piping system 50 enter the heat nest 140, the contents start heating up immediately. When the contents reach the bottom 90 the contents are fully heated. As the contents travel back up the heat nest 140, the contents do not lose heat because the heat conductive material 100 has reached the equilibrium temperature. Use of the heat conductive material 100 within the well 110 ensures a system that uniquely maximizes the transport of heat from the heat nest 140 of the well 110 to the top 180. The combination of a heat nest 140 and insulation 70 is especially effective for deep wells where the length of the well 110 causes heat loss.

It is to be understood that the equilibrium temperature may differ within each well and for different contents depending on a variety of factors. For example, the type of rock present within a well may be a factor in determining the depth, size, and materials used in constructing a heat nest 140 and the type and quality of the heat conductive material 100. The surface area of the rock within the well influences the heat conductivity of the rock, yielding different ranges of temperatures for the equilibrium temperature. The equilibrium temperature may therefore be a range of temperatures and may vary according to the heat needed to be obtained to heat the contents to a desired point.

As an additional feature, the heat conductive material 100 provides additional stability to the system, minimizing the effects of increased pressure and increasing the integrity and strength of the heat exchanging element 40. More specifically, as the heat conductive material 100 hardens, it provides additional structural support for the heat exchanging element 40, the hardened heat conductive material 100 provides structural support for the piping system 50 and the one or more downward-flowing pipes 60 and the one or more upward-flowing pipes 80 that are under pressure. Accordingly, the heat conductive material 100 adds to the rigidity of the system. Furthermore, the heat conductive material 100 improves the stability of the system by protecting system components such as the heat exchanging element 40 and the contents of the piping system 50 from the caustic environment within the well.

Referring still to FIG. 1, the heated contents flow out of the heat harnessing component 10 and into the electricity generating component 20. More specifically, the heated contents flow out of the well 110 and into the thermal engine 120 positioned at the surface, where the heat from the contents is used to generate electricity utilizing techniques well known in the art.

Figure 4:
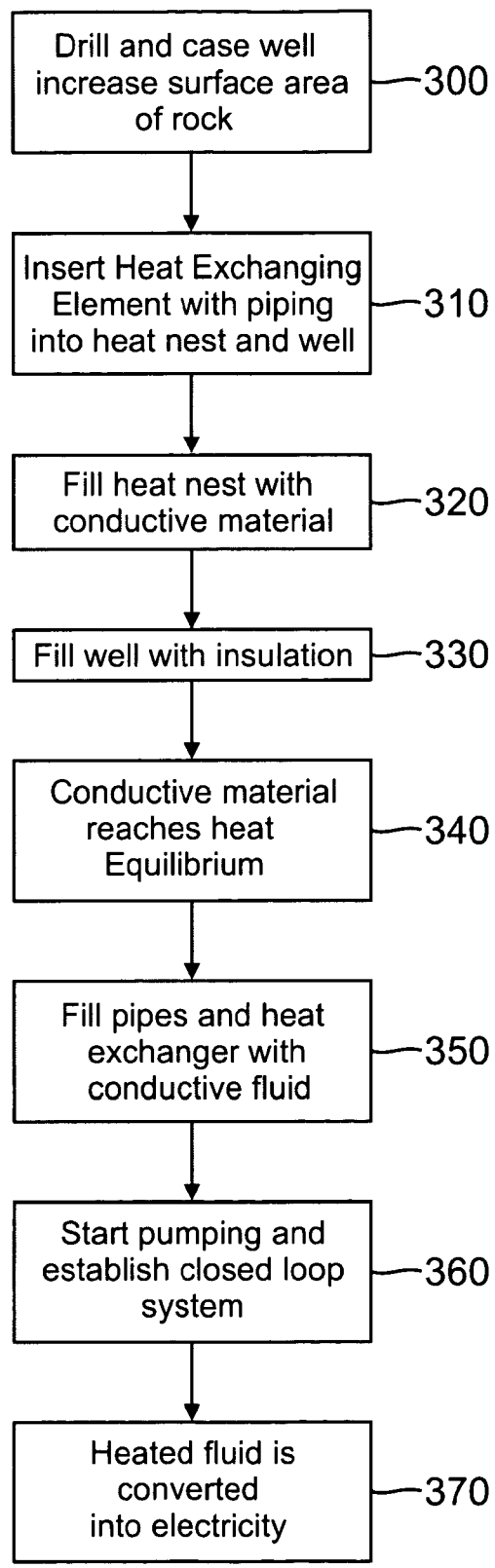
FIG. 4 is a flow chart showing steps in a method for generating electricity according to one embodiment of the present invention.

FIG. 4 is a flow-chart describing steps in a process for extracting geothermal heat and generating electricity utilizing the system and method of the present invention. A well 110 is drilled and cased via bore hole 190, and the surface area of the rock at a desired depth is increased in step 300. This step includes determining the appropriate location and size for a heat nest 140 once the heat point 130 and bottom 90 of the well 110 are estimated. In conjunction with FIGS. 1 and 2, the heat nest 140 is built as in step 310 by inserting a heat exchanging element 40 having the one or more downward-flowing pipes 60 flowing into the first side 150 and the one or more upward-flowing pipes 80 flowing out of the second, opposing side 160 is placed into the well 110 at a desired depth. The starting point of desired depth is the heat point 130 and is determined as a function of the desired temperature to which the contents of the piping system 50 are to be heated, based on the type and surface area of the surrounding rock. The length of the heat nest 140 determines the length of the heat exchanging element 40 and consequently the configuration of internal components of the heat exchanging element 40.

Once the heat exchanging element 40 and piping system 50 have been installed in the well 110, the heat nest 140 is completely filled with the heat conductive material 100 from the bottom up as in step 320. This is accomplished by injecting the heat conductive material 100 into the well 110 via the large diameter pipe 210. In an alternate embodiment, a third pipe is inserted into the well 110 to pump the heat conductive material 100 into the well 110. The third pipe is then slowly withdrawn from the bottom 90 of the well 110 as the heat conductive material 100 is pumped into the well 110, until it reaches the heat point 130. The well 110 is then filled with insulation 70 from the heat point 130 to the top 180 of the well 110 as shown in step 330.

Once the heat nest 140 has been completely filled with heat conductive material 100 and the large diameter pipe 210 has been completely withdrawn from the well 110, the heat conductive material 100 will begin to harden and heat up in temperature until the equilibrium temperature is reached, thereby conducting geothermal heat from the hot rock surrounding the heat nest 140 at the bottom 90 of the well 110 to the heat exchanging element 40 as in step 340. Once the heat conductive material 100 reaches the equilibrium temperature, a fluid or gas is pumped into the well 110, through the one or more downward-flowing pipes 60 and into the heat exchanging element 40 as in step 350. This fluid or gas forms the contents of the piping system 50 and will be geothermally heated within the heat exchanging element 40 to form the closed-loop, solid state heat extraction system as in step 360. The contents are then drawn back up from the well 110 via the one or more upward-flowing pipes 80. Insulation 70 injected in the well 110 helps to keep the heated contents hot as the contents travel upward through the well 110, minimizing energy loss so the heat can be used for the generation of power.

The heated contents then flow out of the well 110 and into the electricity generating component 20 and the thermal engine 120 at the surface, where the heat from the contents is used to generate electricity as in step 370 utilizing techniques well known in the art.

Figure 5:
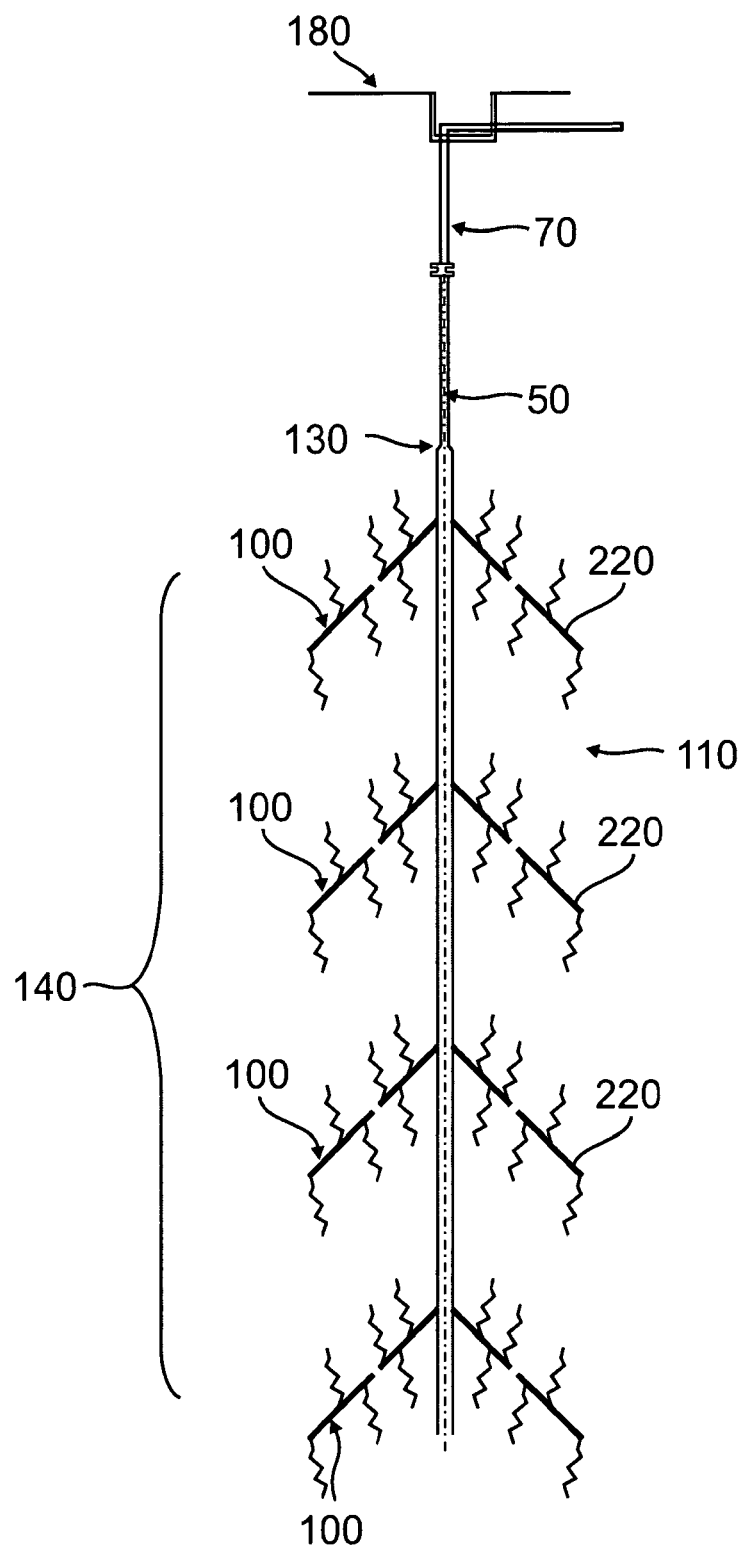
FIG. 5 is a cross-sectional view of a well and heat nest according to one embodiment of the present invention.

In an alternative embodiment, as discussed above, the system may include multiple, additional materials used in conjunction with the heat conductive material 100. FIG. 5 illustrates a cross-sectional, conceptual view of a well 110. FIG. 5 illustrates a heat nest 140 according to the present invention in which several holes 220 have been drilled into rock surrounding the heat nest 140 to increase surface area by filling the several holes 220 with the additional materials. In FIG. 5, geothermal heat flows from the cracks and crevices formed in the rock by drilling the several holes 220. The present invention contemplates that, prior to building the heat nest 140, the surface area of the rock will be increased as much as possible to maximize the flow of geothermal heat from the surrounding rock and into the heat exchanging element 40 via the heat conductive material 100. Use of additional materials also allows more of the fluid to be heated to a desired temperature and therefore more electricity to be generated.

Figure 6:
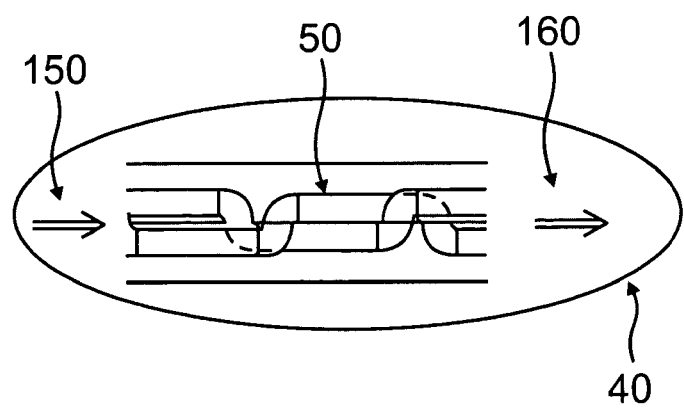
FIG. 6 is a cross-sectional view of a heat-exchanging element according to one embodiment of the present invention.

In another embodiment, the system may include multiple, additional heat exchanging components and/or heat exchanging elements with many different configurations of internal components. Different configurations of the internal components of the heat exchanging element 40 are also possible. Increasing the time that contents of the piping system 50 are inside the heat exchanging element 40 increases the amount of fluid or gas that can be heated inside the heat nest 140. One such configuration is a helix formation in which the internal components are a series of intertwined pipes. Other configurations such as twisted pipes as shown in FIG. 6 exemplify the embodiment in which increasing the length of pipe (and, therefore, the distance contents must travel within heat exchanging element 40) increases the amount of contents that can be heated.

It is to be understood that other embodiments may be utilized and structural and functional changes may be made without departing from the scope of the present invention. The foregoing descriptions of the embodiments of the invention have been presented for the purposes of illustration and description. It is not intended to be exhaustive or to limit the invention to the precise forms disclosed. Accordingly, many modifications and variations are possible in light of the above teachings. For example, multiple heat exchanging elements 40 may be implemented within a heat nest 140. Additionally, any configuration of a heat exchanging element 40 that increases the time contents of the piping system remain in the heat exchanging element may be utilized. Also, multiple bore holes may be drilled into rock surrounding the heat nest to create more surface area, and such bore holes may be used to drill holes vertically, horizontally, diagonally, or at any angle to create more surface area through which geothermal energy may flow. It is therefore intended that the scope of the invention not be limited by this detailed description.

The invention claimed is:

1. A system for generating electricity using geothermal heat from within a drilled well, comprising:
    a heat nest configured in an area between a heat point determined as a lowest depth where appropriate heat is encountered in a well and the bottom of a bore hole of the well;
    multiple bore holes being drilled into rock surrounding the heat nest configured to create more surface area through which geothermal energy may flow, the multiple bore holes being drilled in multiple directions, including drilled vertically, horizontally, diagonally or any angle, in relation to the bore hole of the well and being filled with heat conductive material;
    a heat exchanging element configured with a first side and a second side, and configured in the heat nest at a point between the heat point of the well and the bottom of the bore hole of the well;
    a piping system configured with a downward flow pipe coupled to the first side of the heat exchanging element for bringing contents from a surface of the well into the heat nest and configured with an upward flow pipe coupled to the second side of the heat exchanging element for carrying heated contents to the surface of the well from the heat nest;

a heat conductive material injected into an area within the heat nest near the bottom of the well between the heat exchanging element and rock surrounding the heat nest to form a closed-loop, solid state heat exchange system to heat contents of the piping system flowing into and out of the heat exchanging element at an equilibrium temperature at which the rock surrounding the heat nest and generating the geothermal heat continually recoups the geothermal heat it is conducting to the heat conductive material and above which the geothermal heat generated by the rock surrounding the heat nest dissipates as the heat conductive material conducts heat from the rock surrounding the heat nest to the heat exchanging element, the heat conductive material connecting the rock surrounding the heat nest and the heat exchanging element, the heat conductive material solidifying to substantially fill the area within the heat nest to transfer heat from the rock surrounding the heat nest and the heat exchanging element;

an electricity generating component including a thermal engine, the electricity generating component receiving geothermal heat from the contents of the piping system coupling a heat harnessing component to the electricity generating component, with the upward-flow pipe conveying the contents of the piping system heated by the heat exchanging element to the surface of the well and into the electricity generating component; and insulation inserted into the well and to surround at least the upward- flow pipe on at least one position between the heat nest and the surface of the well to maintain a temperature of the contents of the piping system constant as the contents of the piping system are pumped to the surface of the well, wherein the closed-loop solid state heat extraction system extracts geothermal heat from the well without exposing the rock surrounding the heat nest to a liquid flow.

2. The system of claim 1, wherein the multiple bore holes include cracks or crevices formed in the rock by drilling the multiple bore holes.

3. The system of claim 1, wherein the piping system includes a set of flexible downward-flow pipes that carry the contents of the piping system into the heat exchanging element, and a set of flexible upward-flow pipes that carry the contents of the piping system out of the heat exchanging element.

4. The system of claim 1, wherein the heat exchanging element includes a plurality of capillaries and the contents of the downward-flow pipe are dispersed through the plurality of capillaries after entering the heat exchanging element, and wherein each capillary in the plurality of capillaries has a diameter smaller than a diameter of the downward-flow pipe.

5. The system of claim 1, wherein the contents of the piping system are an environmentally inert, heat conductive fluid that does not boil when heated within the heat nest, wherein the contents of the piping system are water or a gas.

6. The system of claim 1, wherein the heat conductive material substantially solidifies within the heat nest after being injected into the area between the rock surrounding the heat nest and the piping system, wherein the heat conductive material is grout, a molten metal, a ceramic, a mesh material, or plastic.

7. The system of claim 1, wherein after the heat nest is filled with the heat conductive material, the well is filled with the insulation.

8. The system of claim 1, wherein the heat conductive material is injected into the heat nest via a pipe inserted through a bore hole and withdrawn once the heat nest has been filled with the heat conductive material.

9. The system of claim 1, wherein the heat exchanging element has a helix shape, and the piping system within the heat exchanging element comprises at least one twisted pipe to increase the distance contents of the piping system flows within the heat exchanging element.

10. The system of claim 1, wherein the equilibrium temperature is increased by increasing the surface area of the rock surrounding the heat nest.

11. The system of claim 1, wherein the heat conductive material stabilizes pressure on the piping system and the heat exchanging element within the heat nest.

12. The system of claim 1, wherein the equilibrium temperature is a range of temperatures determined at least in part by a surface area of the rock within the heat nest.

13. The system of claim 1, wherein the surface area of the rock surrounding the heat nest is increased by fracturing the rock surrounding the heat nest.

14. The system of claim 1, wherein the heat exchanging element is a cross-flow heat exchanger configured so that heat flows perpendicular to the fluid, such that the heat flow passes over/around the cross-flow heat exchanger in a perpendicular direction, so as to heat the fluid which flows through a direction perpendicular to the heat flow.

15. The system of claim 1, wherein the heat conductive material is copper.

16. The system of claim 2, further comprising at least one additional material injected into the multiple bore holes, wherein the at least one additional material is at least one ball bearing, at least one bead, or wire, or a meshed metallic material, pipes or any combination thereof.

17. The system of claim 3, wherein the downward-flow pipes and upward-flow pipes each include a plurality of layers of wound corrosion resistant steel wiring.

18. The system of claim 14, wherein the cross-flow heat exchanger is a high temperature heat exchanger comprised of a recuperative type "cross flow" heat exchanger, in which fluids are heated on either side of a dividing wall.

19. The system of claim 14, wherein the cross-flow heat exchanger is comprises a high temperature heat exchanger (HTHE) which utilizes a regenerative or evaporative design.

20. A method of generating electricity using geothermal heat from within a drilled well, comprising:

determining a type of rock at a depth of a well, a surface area of the rock at the depth of the well, and a heat conductivity factor of the rock at the depth of the well;

increasing the surface area of the rock at a desired point in the well between a heat point of the well and a bottom of the well;

forming a heat nest within the well beginning at the bottom of the well and ending at the heat point of the well;

drilling multiple bore holes into rock surrounding the heat nest configured to create more surface area through which geothermal energy may flow, the multiple bore holes being drilled in multiple directions, including drilled vertically, horizontally, diagonally or any angle, in relation to the bore hole of the well and being filled with heat conductive material;

injecting a heat conductive material between the rock surrounding the heat nest and a heat exchanging element having a first side and a second side to form a closed-loop solid-state heat extraction system to exchange heat from the rock surrounding the heat nest to the heat exchanging element to heat contents of a piping system flowing from a downward flow pipe into the first side of the heat exchanging element and flowing from the second side of the heat exchanging element into an upward flow pipe at an equilibrium temperature at which the rock surrounding the heat nest and generating the geothermal heat continually recoups the geothermal heat by exchanging with the heat conductive material and above said temperature the geothermal heat generated by the rock surrounding the heat nest dissipates as the heat conductive material exchanges heat from the rock surrounding the heat nest to the heat exchanging element;

insulating the piping system between the heat nest and a surface of the well; and pumping the heated contents of the piping system into an electricity generating component after the heated contents of the piping system reaches the surface of the well, wherein the closed-loop solid state heat extraction system extracts geothermal heat from the well without exposing the rock surrounding the heat nest to a liquid flow.

21. The method of claim 20, wherein the multiple bore holes include cracks or crevices formed in the rock by drilling the multiple bore holes.

22. The method of claim 20, further comprising pumping contents of the piping system into the heat exchanging element in a set of flexible, downward-flow pipes and out of the heat exchanging element in a set of flexible, upward-flow pipes.

23. The method of claim 20, wherein the contents of the piping system are an environmentally inert, heat conductive fluid that does not boil when heated within the heat nest, including wherein the contents of the piping system are water or gas.

24. The method of claim 20, further comprising injecting the heat conductive material into the heat nest, the heat conductive material substantially solidifying within the heat nest after being injected into the area between the rock surrounding the heat nest and the piping system, wherein the heat conductive material is grout, molten metal, a mesh material or plastic.

25. The method of claim 20, wherein the extracting geothermal heat further comprises forming a shape of the heat exchanging element into a helix, in which the piping system within the heat exchanging element comprises at least one twisted pipe to increase a distance contents of the piping system flows within the heat exchanging element.

26. The method of claim 20, wherein the increasing the surface area of the rock surrounding the heat nest to increase the equilibrium temperature further comprises fracturing the surface area of the rock surrounding the heat nest.

27. The method of claim 20, wherein the equilibrium temperature is a range of temperatures.

28. The method of claim 20, wherein the method comprises filing the multiple bore holes with at least one additional material configured to increase the surface area of conduction, so that geothermal heat conducted from the rock surrounding the heat nest is released over greater surface areas provided by the introduction of the at least one additional material into the heat nest.

29. The method of claim 20, wherein the method further comprises configuring the heat exchanging element as a cross-flow heat exchanger so that heat flows perpendicular to the fluid which needs to be heated, such that the heat flow passes over/around the exchanger in a perpendicular direction, so as to heat the fluid which flows through a direction perpendicular to the heat flow.

30. The method of claim 21, further comprising injecting at least one additional material in the multiple bore holes, wherein the at least one additional material is at least one ball bearing, at least one bead, or wire, or a meshed metallic material, or pipes, or any combination thereof.

31. The method of claim 22, wherein the downward-flow pipes and upward-flow pipes each include a plurality of layers of wound corrosion resistant steel wiring.

32. The method of claim 22, further comprising dispersing the contents of the piping system into a plurality of capillaries coupled to the piping system within the heat nest, wherein each capillary in the plurality of capillaries has a diameter smaller than a diameter of the downward-flow pipes.

33. The method of claim 24, wherein the injecting the heat conductive material into the heat nest further comprises inserting a pipe through a bore hole and withdrawing the pipe once the heat nest has been filled with the heat conductive material.

34. The method of claim 28, the method further comprises bonding the heat conductive material with the at least one additional material and solidifying the heat conductive material around the at least one additional material.

35. The method of claim 29, wherein the method configuring the cross-flow heat exchanger as a high temperature heat exchanger comprised of a recuperative type "cross flow" heat exchanger, in which fluids heat on either side of a dividing wall.

36. The method of claim 29, wherein the cross-flow heat exchanger is configured with two sides, with fluid flowing in one side heating fluid flowing in another side.

* * * * *